Nov. 13, 1962    J. E. HANCOCK    3,063,740
TONGUE FOR ELEVATING SCRAPER
Filed Feb. 3, 1961
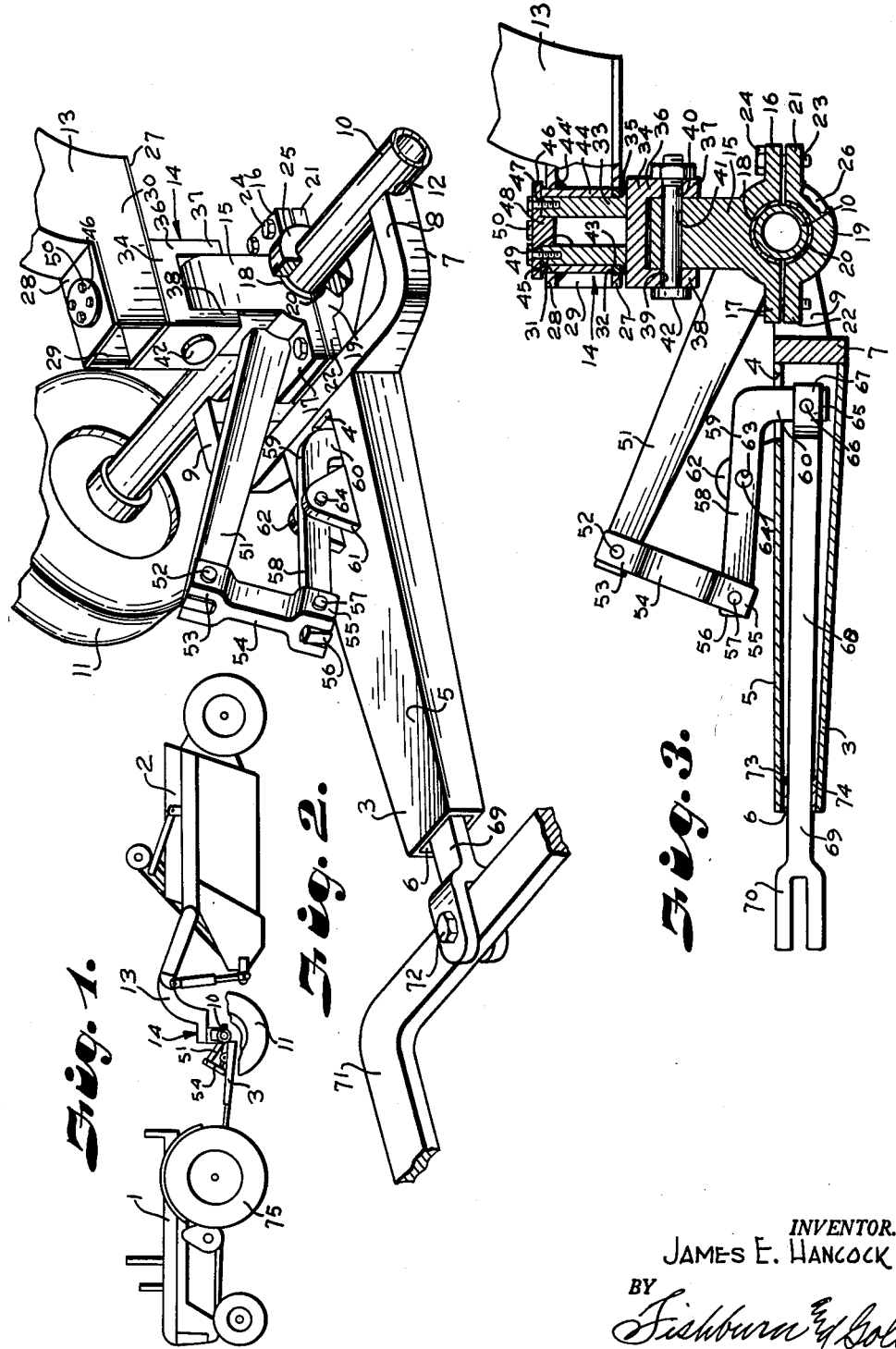
INVENTOR.
JAMES E. HANCOCK
BY
Fishburn & Gold,
ATTORNEYS 3,063,740
TONGUE FOR ELEVATING SCRAPER
James E. Hancock, % Hancock Mfg. Co., P.O. Box 1359, Amarillo Highway, Lubbock, Tex.
Filed Feb. 3, 1961, Ser. No. 86,954
6 Claims. (Cl. 280—446)

This invention relates to apparatus for exerting downward pressure on the tongue of an implement for increasing the traction grip of the tractor to which the tongue is attached.

The implement to which my apparatus is applied is of the character shown in my Patent No. 2,791,041 of May 7, 1957.

When a four wheeled tractor is used to pull an implement by means of a tongue, there is usually not enough weight of the implement applying force on the rear wheels of the tractor to effect the traction. Quite frequently the tractor is lighter in weight than the load on the implement and the tractor wheels will spin in pulling a heavy load.

The principal object of the present invention is to provide apparatus for applying or exerting a downward force on the tongue of the implement which is proportional to the pulling force exerted by the tractor.

Other objects of the present invention are to provide a hollow tongue for an implement to be drawn by a tractor provided with an opening or slot in the top thereof having upstanding laterally spaced brackets on each side of said slot to which is pivotally attached a bell crank member with one end thereof extending into the tubular tongue and its other end pivotally connected to a link member extending upwardly and pivotally connected to a rigid arm extending upwardly and forwardly from a fifth wheel assembly having a block pivotally mounted on the axle of the implement; to provide a pull bar or rod pivotally connected to the bell crank member extending into the tongue and having its other end extending outwardly of the forward open end of the tongue and adapted to be attached to the draw bar of the tractor; to provide for rigid attachment of the arm to the post of the implement so that the rigid member will turn with the tongue of the implement; to provide for mounting of the tongue on the axle of the vehicle, and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a side view of the tractor and implement showing my apparatus for exerting downward force on the tongue member.

FIG. 2 is an enlarged perspective partly fragmentary view of the apparatus for exerting downward force on the tongue with parts broken away to better illustrate the invention.

FIG. 3 is an enlarged cross sectional partly fragmentary view showing the fifth wheel assembly and pivotal mounting of the goose neck of the implement to the post on the axle.

Referring more in detail to the drawings:

1 designates a tractor and 2 an implement such as an earth handling device or elevating scraper, as they are sometimes called, and as shown in Patent No. 2,791,041. The implement 2 has a tongue 3 of hollow construction having an elongated slot 4 in its upper side 5 near its rear end and an open end 6. The tongue has a yoked end 7 comprising spaced arms 8 and 9 secured to the axle 10 which carries a pair of wheels 11. The tongue is rigidly mounted to the axle 10 by the arms 8 and 9 by suitable means such as welding as indicated at 12. The implement also includes a goose neck 13 of tubular construction as is the usual practice for attachment to a fifth wheel assembly indicated generally at 14.

Mounted for fore and aft rotation on the axle 10 at substantially the center thereof is a post or block member 15 which has forwardly and rearwardly extending flanges or arms 16 and 17, and a semicircular portion in its lower end as indicated at 18 which bears on the upper side of said axle. A plate or bearing member 19 having a semi-circular portion 20 and flanges 21 and 22 mating with the flanges 16 and 17 is provided for engaging the under side of the axle 10. The flanges 16 and 17 and 21 and 22 are provided with aligned openings as shown at 23 for receiving bolts 24 for detachably and rotatably mounting the block 15 on said axle, the two semi-circular portions 18 and 20 providing a bearing for said block on said axle. Spaced collars 25 and 26 are provided on the axle 10 on each side of the block 15 to prevent lateral movement of the block on the axle.

The goose neck 13 includes forwardly extending spaced plates 27 and 28 having sides 29 and 30 and aligned openings 31 and 32 for receiving the fifth wheel assembly 14. The fifth wheel assembly includes a tubular member 33 which extends vertically through the openings 31 and 32 and has its lower end welded or otherwise suitably secured to the top plate 34 as indicated at 35 of a yoke member 36 having depending spaced arms 37 and 38 provided with aligned openings 39 and 40. A post or block member 15 has an opening 41 longitudinally of the implement and a bolt 42 engages in said opening and the openings 39 and 40 of the arms of the yoke 36 to pivotally mount the goose neck 13 of the implement to the axle 10 for transverse or lateral rotatable movement of the axle 10 with the implement when the wheels 11 are on uneven ground.

A wear washer 43 is provided for surrounding the lower end of the tubular member 33 and engages in the opening 31 of the plate or arm 27. A sleeve 44 surrounds the tubular member 33 and has its lower end engaging the wear washer 43 and its upper end extends through the opening 32 in the upper plate 28 of the goose neck 13 and is welded thereto as indicated at 44' (FIG. 3). The upper edge of the tubular member 33 has spaced threaded sockets 45 and a cap plate 46 has spaced openings 47 and a depending center boss 48 for extending into the open upper end 49 of the tubular member 33. The cap 46 is secured to the tubular member 33 by stud bolts 50 which engage in the threaded sockets 45 to retain the goose neck 13 on the fifth wheel assembly 14.

Rigidly secured to the block 15 on the axle 10 by welding or other suitable means is a forwardly and upwardly extending arm 51 having an opening near its outer end to which is pivotally attached by a pin 52 the bifurcated end 53 of a link 54 having its other bifurcated end 55 secured to the end 56 by a pin 57 of the arm 58 of a bell crank member 59, the other arm 60 of which extends through the slot 4 of the tongue 3. Secured on the upper side 5 of the tongue 3 by welding or other suitable means are spaced brackets 61 and 62 having aligned openings 63 for receiving a pin 64 extending through an opening in the arm 58 of the bell crank 59 for pivotally mounting the bell crank to the brackets. The lower end 65 of the downwardly extending arm 60 of the bell crank 59 is pivotally attached by a pin 66 to the bifurcated end 67 of a connecting bar or rod 68 having its other end 69 extending through the opening 6 in the outer end of the tongue and has a bifurcated end 70 for attachment to a draw bar 71 of the tractor 1 by a pin 72 for a swinging pivotal movement of the tongue with respect to the draw bar when turning the tractor.

The opening 6 in the end of the tongue 3 is reduced by welding of lugs or plates 73 and 74 in said opening to prevent excessive vertical movement between the bar 68 and the hollow tongue.

In operation of the apparatus constructed and assembled as described, pull on the bar 63 through the draw bar 71 of the tractor will exert a forward movement of the end 65 of the bell crank 59 causing it to pivot on its pivot pin 64 thereby exerting enough pressure on the end 56 thereof to create an upward force on the link 54. The upward force on the link 54 is resisted by the rigid arm 51 secured to the block 15 of the axle 10 thereby exerting a downward force on the tongue 3 and thereby on the traction wheels 75 of the tractor to afford the traction wheels with greater traction grip for more efficient pulling of the implement 2.

It will be obvious from the foregoing that I have provided an improved apparatus for attachment to the tongue of an implement and to the axle construction thereof whereby greater traction will be applied to the wheels of the tractor pulling the implement.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. Apparatus for exerting a downward force on the tongue attached to the axle of an implement and adapted for attachment to a draw bar of a tractor, said tongue being hollow and having an upper side, said upper side being provided with a slot comprising, brackets rigidly mounted on each side of said slot, a bell crank member pivotally mounted on said brackets, one arm of said member extending into said hollow tongue and the other arm extending forwardly above said tongue, a block member on said axle, an arm, means rigidly securing said arm to said block member and said arm extending forwardly and upwardly above said tongue, a link, one end of said link being pivotally connected to one end of said arm and its other end pivotally connected to the forward end of said bell crank member, and a bar movable in said tongue having one end pivotally connected to the end of the bell crank member extending into said hollow tongue and its other end adapted to be attached to the draw bar of the tractor whereby pull on said bar will tend to exert an upward force on said arm of the bell crank member above said tongue and said force will be resisted by the connection of said link to said arm.

2. Apparatus for exerting a downward force on the tongue secured to an axle of an implement, said axle having a block member, said implement having a fifth wheel assembly attached to said block member and said apparatus being adapted for attachment to a draw bar of a tractor, said tongue being hollow and having an upper side, said upper side being provided with a slot and having an open forward end comprising, brackets rigidly mounted on each side of said slot, an L-shaped crank member pivotally mounted on said brackets, one arm of said member extending into said hollow tongue and the other arm extending forwardly above and in alignment with said tongue, an arm, means rigidly securing said arm to said block member and said arm extending forwardly and upwardly above said other arm of the bell crank member, a link, one end of said link being pivotally connected to one end of said arm and its other end pivotally connected to the forward end of said bell crank member, and a bar movable in said tongue having one end pivotally connected to the end of the bell crank member extending into said hollow tongue and its other end adapted to be attached to the draw bar of the tractor whereby pull on said bar will tend to exert an upward force on said arm of the bell crank member above said tongue and said force will be resisted by the connection of said link to said arm thereby creating a downward force on said tongue to increase the traction of the tractor.

3. Apparatus for exerting a downward force on the tongue rigidly secured to an axle of an implement, said axle having an upstanding block member, said implement having a fifth wheel assembly for pivotal attachment to said block member and said apparatus being adapted for attachment to a draw bar of a tractor, said tongue being hollow and having an upper side, said upper side being provided with a slot near its rear end and having an open forward end, brackets rigidly mounted on each side of said slot, an L-shaped crank member pivotally mounted on said brackets, one arm of said member extending into said hollow tongue and the other arm extending forwardly above and in alignment with said tongue, an arm, means rigidly securing said arm to said block member and said arm extending forwardly and upwardly above said other arm of the bell crank member, a link, one end of said link being pivotally connected to one end of said arm and its other end pivotally connected to the forward end of said bell crank member, and a bar movable in said tongue having one end pivotally connected to the end of the bell crank member extending into said hollow tongue and its other end adapted to be attached to the draw bar of the tractor whereby pull on said bar will tend to exert an upward force on said arm of the bell crank member above said tongue and said force will be resisted by the connection of said link to said arm thereby creating a downward force on said tongue to increase the traction of the tractor.

4. Apparatus adapted for attachment to a draw bar of a tractor and for exerting a downward force on the tongue of an implement, said implement having an axle having a post and a fifth wheel assembly said tongue being rigidly attached to said axle, said tongue being hollow and having an upper side, said upper side being provided with a slot comprising, brackets rigidly mounted on each side of said slot, a bell crank member pivotally mounted on said brackets, one arm of said member extending into said hollow tongue and the other arm extending forwardly above said tongue, means on said axle for pivotal attachment of said fifth wheel assembly thereto so that said assembly will rock transversely of said axle, an arm, means rigidly securing one end of said arm to said first named means so that said arm extends upwardly and forwardly above said tongue, a link, one end of said link being pivotally connected to the free end of said arm and its other end pivotally connected to the forward end of said bell crank member, and a bar having one end pivotally connected to the end of the bell crank member extending into said hollow tongue and its other end adapted to be attached to the draw bar of the tractor whereby pull on said bar will tend to exert an upward force on said arm of the bell crank member above said tongue and said force will be resisted by the connection of said link to said arm thereby creating a downward force on said tongue to increase the traction of the tractor.

5. A tongue for a wheeled implement having a front axle and an upstanding post for attachment of a fifth wheel assembly, said tongue being of tubular form and rigidly attached to said axle, said fifth wheel assembly being pivotally attached to said post, an arm, said arm being rigidly attached to said post and extending upwardly and forwardly in longitudinal alignment with said tongue, said tongue having a top and having a slot therein, an L-shaped arm, means pivotally mounting said L-shaped arm on said tongue, one leg of said L-shaped arm extending forwardly in longitudinal alignment with said tongue and the other leg of said L-shaped arm extending through said slot into the tongue, a link connecting the forward end of said rigid arm and the forward end of the leg of the L-shaped arm above said tongue, and a bar movable in said tongue having its rear end pivotally attached to said leg of the L-shaped arm extending into said tongue and its forward end extending outwardly of said tongue and adapted to be attached to the draw bar of the tractor whereby horizontal pull on said bar will exert a vertically downward force on said tongue to increase the traction of said tractor.

6. A tongue for a wheeled implement having a front axle, said tongue being of tubular form and having one end rigidly attached to said axle, an arm, means rigidly attaching said arm to said axle, said arm extending upwardly and forwardly in longitudinal alignment with said tongue, said tongue having a top and having a slot therein, an L-shaped arm, means pivotally mounting said L-shaped arm on said tongue, one leg of said L-shaped arm extending forwardly in longitudinal alignment with said tongue and the other leg of said L-shaped arm extending through said slot into the tongue, a link having one of its ends connected to the forward end of said rigid arm and its other end connected to the forward end of the leg of the L-shaped arm above said tongue, and a bar movable in said tongue having its rear end pivotally attached to said leg of the L-shaped arm extending into said tongue and its forward end extending outwardly of said tongue and adapted to be attached to the tractor whereby horizontal pull on said bar will exert a vertically downward force on said tongue to increase the traction of said tractor.

References Cited in the file of this patent

UNITED STATES PATENTS

| | | |
|---|---|---|
| 2,312,258 | Martin | Feb. 23, 1943 |

FOREIGN PATENTS

| | | |
|---|---|---|
| 273,132 | Great Britain | Oct. 20, 1926 |
| 291,587 | Great Britain | May 4, 1927 |